US012180785B2

(12) United States Patent
Seiple

(10) Patent No.: US 12,180,785 B2
(45) **Date of Patent: *Dec. 31, 2024**

(54) IDLER FOR A WINDOW TREATMENT

(71) Applicant: Lutron Technology Company LLC, Coopersburg, PA (US)

(72) Inventor: Randy C. Seiple, Nazareth, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 230 days.

This patent is subject to a terminal disclaimer.

(21) Appl. No.: 17/806,121

(22) Filed: Jun. 9, 2022

(65) Prior Publication Data

US 2022/0298855 A1 Sep. 22, 2022

Related U.S. Application Data

(63) Continuation of application No. 17/012,663, filed on Sep. 4, 2020, now Pat. No. 11,384,597.

(60) Provisional application No. 62/896,618, filed on Sep. 6, 2019.

(51) Int. Cl.
*E06B 9/50* (2006.01)
*E06B 9/72* (2006.01)

(52) U.S. Cl.
CPC . *E06B 9/50* (2013.01); *E06B 9/72* (2013.01)

(58) Field of Classification Search
CPC .................................... E06B 9/50; E06B 9/72
USPC .......................................................... 160/310
See application file for complete search history.

(56) References Cited

U.S. PATENT DOCUMENTS 3,340,922 A 9/1967 Anderson
4,399,857 A 8/1983 Honma
7,380,582 B1 6/2008 Anderson et al.
7,641,491 B2 1/2010 Altonen et al.
8,173,920 B2 5/2012 Altonen et al.
8,408,486 B2 4/2013 Di Stefano
8,893,766 B2 11/2014 Bohlen
9,222,305 B2 12/2015 Di Stefano
9,238,939 B2 1/2016 Di Stefano
9,368,025 B2 6/2016 Carmen, Jr.
9,790,738 B2 10/2017 Jung et al.
10,181,385 B2 1/2019 Bhate et al.
10,798,792 B2 10/2020 McDonald et al.
10,858,885 B2 12/2020 Walter-Seifart
(Continued)

FOREIGN PATENT DOCUMENTS

WO 2012149067 A2 11/2012

*Primary Examiner* — Beth A Stephan
(74) *Attorney, Agent, or Firm* — Duane Morris LLP

(57) ABSTRACT

A window treatment system includes a roller tube, a covering material, a motor drive unit, and an idler. The covering material is coupled to the roller tube such that the covering material is configured to be wound and unwound from the roller tube when the roller tube rotates. The motor drive unit is configured to rotate the roller tube. The idler includes a bearing sleeve, a bearing, a bearing retainer, and a pin. The bearing sleeve and the roller tube rotate together. The bearing sleeve includes a cavity and a flange. The bearing is disposed at least partially within the cavity and also defines a bore. The bearing retainer is disposed between the flange and an outboard face of the bearing to maintain the bearing's position. The pin is disposed in the bore such that the bearing sleeve and the roller tube rotate with respect to the pin.

20 Claims, 6 Drawing Sheets

(56) References Cited

U.S. PATENT DOCUMENTS

| | | | | |
|---|---|---|---|---|
| 11,384,597 | B2 * | 7/2022 | Seiple | E06B 9/50 |
| 2008/0121353 | A1 | 5/2008 | Detmer et al. | |
| 2008/0142171 | A1 | 6/2008 | Koop et al. | |
| 2016/0369558 | A1 | 12/2016 | Kirby | |
| 2019/0119981 | A1 | 4/2019 | Marocco | |
| 2019/0252137 | A1 | 8/2019 | McDonald et al. | |
| 2020/0018118 | A1 | 1/2020 | Geiger | |

* cited by examiner

IDLER FOR A WINDOW TREATMENT

CROSS-REFERENCE TO RELATED APPLICATIONS

This application is a continuation of U.S. patent application Ser. No. 17/012,663, filed Sep. 4, 2020 claiming priority to U.S. Provisional Patent Application No. 62/896,618, filed Sep. 6, 2019, and entitled "Idler for a Window Treatment," the entireties of which are incorporated by reference herein.

BACKGROUND

A window treatment may be mounted in front of one or more windows, for example to prevent sunlight from entering a space and/or to provide privacy. Window treatments may include, for example, roller shades, roman shades, venetian blinds, or draperies. A roller shade typically includes a flexible shade fabric wound onto an elongated roller tube. Such a roller shade may include a weighted hembar located at a lower end of the shade fabric. The hembar may cause the shade fabric to hang in front of one or more windows over which the roller shade is mounted. A typical window treatment can be mounted to structure surrounding a window, such as a window frame. Such a window treatment may include brackets at opposed ends thereof. The brackets may be configured to operably support the roller tube, such that the flexible material may be raised and lowered. For example, the brackets may be configured to support respective ends of the roller tube. The brackets may be attached to structure, such as a wall, ceiling, window frame, or other structure.

SUMMARY

In one aspect, a window treatment system includes a roller tube, a covering material, a motor drive unit, and an idler. The roller tube extends from a first end to a second end and has a longitudinal axis extending between the first end and the second end. The covering material is coupled to the roller tube such that the covering material is configured to be wound and unwound from the roller tube when the roller tube rotates about the longitudinal axis. The motor drive unit is coupled to the first end of the roller tube and is configured to rotate the roller tube about the longitudinal axis. The idler is coupled to the second end of the roller tube and includes a bearing sleeve, a bearing, a bearing retainer, and a pin. The bearing sleeve is coupled to the roller tube such that the bearing sleeve and the roller tube rotate together about the longitudinal axis. The bearing sleeve includes a body defining a cavity and a flange extending into the cavity. The bearing is disposed at least partially within the cavity of the bearing sleeve and the bearing defines a bore. The bearing retainer is disposed between the flange and an outboard face of the bearing such that the bearing retainer maintains the bearing within the bearing sleeve. The pin is at least partially disposed in the bore of the bearing such that the bearing sleeve and the roller tube are able to rotate about the longitudinal axis with respect to the pin.

In another aspect, an idler for a window treatment system includes a bearing sleeve, a bearing, a bearing retainer, and a pin. The bearing sleeve includes a body defining a cavity and a flange extending into the cavity. The bearing is disposed at least partially within the cavity of the bearing sleeve and defines a bore. The bearing retainer is disposed between the flange and an outboard face of the bearing such that the bearing retainer maintains the bearing within the bearing sleeve. The pin is at least partially disposed in the bore of the bearing such that the bearing sleeve is able to rotate with respect to the pin.

In another aspect, a method of assembling an idler for a window treatment system includes inserting a bearing into a cavity of a bearing sleeve. The method further includes positioning a bearing retainer between the bearing and a flange of the bearing sleeve. The method further includes inserting a pin through a bore of the bearing.

In another aspect, an assembly includes a bearing sleeve, a bearing, a bearing retainer, a pin, and a tube sleeve. The bearing sleeve includes a body defining a cavity and a flange extending into the cavity. The bearing is disposed at least partially within the cavity of the bearing sleeve and defines a bore. The bearing retainer is disposed between the flange and an outboard face of the bearing such that the bearing retainer maintains the bearing within the bearing sleeve. The pin is at least partially disposed in the bore of the bearing such that the bearing sleeve is able to rotate with respect to the pin about a rotation axis of the bearing. The tube sleeve is coupled to the bearing sleeve such that the tube sleeve is capable of axial translation along the rotation axis.

BRIEF DESCRIPTION OF THE DRAWINGS

The features described herein will be more fully disclosed in the following detailed description, which is to be considered together with the accompanying drawings wherein like numbers refer to like parts and further wherein.

DETAILED DESCRIPTION

Figure 1:
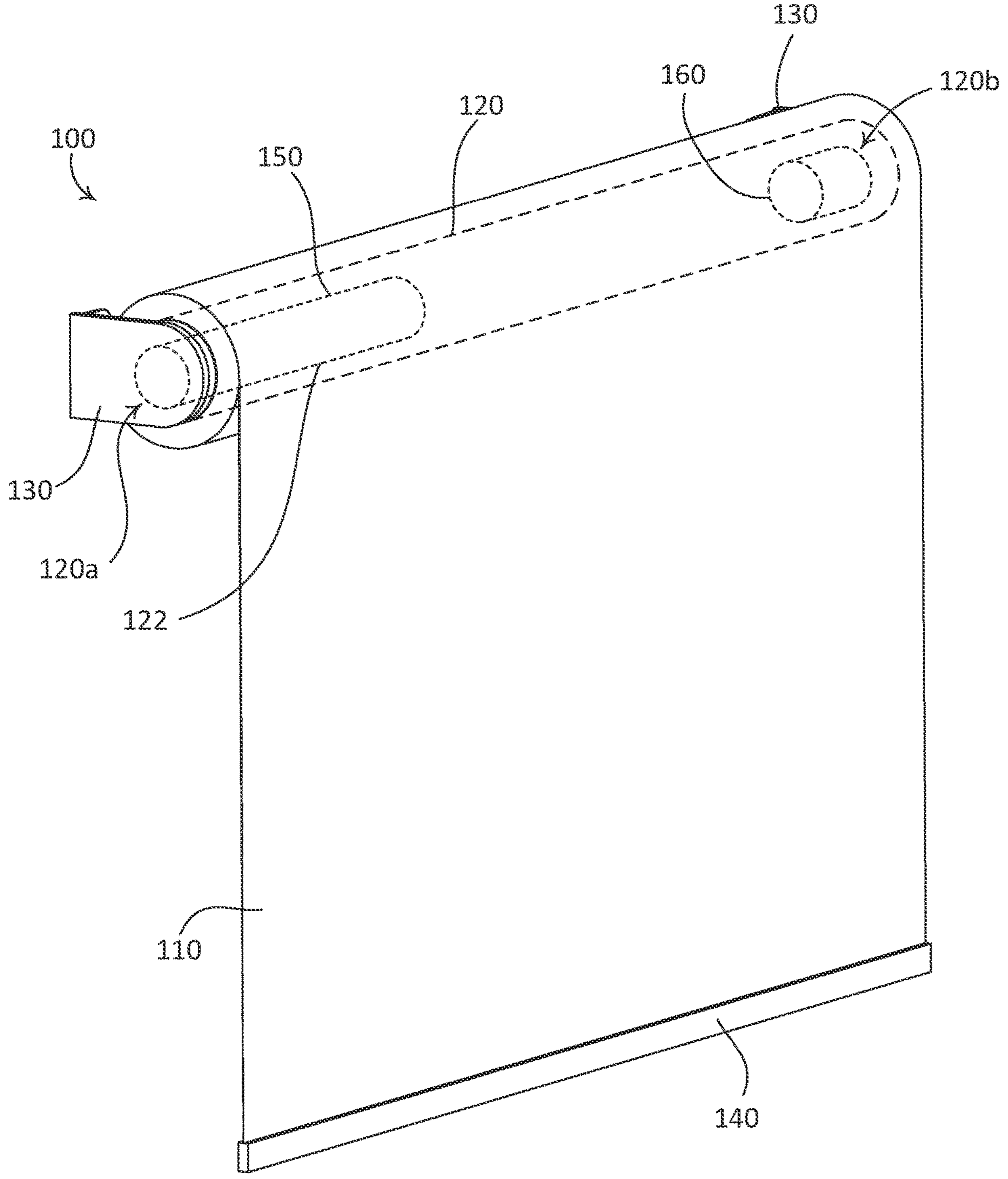
FIG. 1 shows a perspective view of a motorized window treatment system.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The terms "inboard face," "inboard side" or "inboard end" are used to refer to a face, side or end that is nearer the longitudinal center of the roller tube than a corresponding "outboard face," "outboard side" or "outboard end."

The window treatment systems described herein include idlers that may have improved structural performance when compared to prior art idlers. These idlers may be configured to ensure that the components of the idler remain engaged throughout use. Such idlers may allow for the use of larger window treatments that may not have been possible with prior art idler designs. For example, window treatments including the idlers described herein may include a window covering material with dimensions up to 12 feet wide by 12 feet long, for example. This may allow for larger windows to be covered by a single window treatment.

FIG. 1 illustrates a perspective view of an example motorized window treatment, such as a motorized roller shade 100. The motorized roller shade 100 may be configured to detect and respond to at least one state or state change, in accordance with some embodiments. The motorized roller shade 100 may include a covering material 110 (e.g., a flexible material, such as a shade fabric) windingly received around a roller tube 120. The roller tube 120 may extend from a first end 120*a* to a second end 120*b*. A longitudinal axis 122 may extend from the first end 120*a* to the second end 120*b*. The roller tube 120 may be rotatably supported by mounting brackets 130, which may be attached to structure adjacent a window (e.g., a wall or ceiling) that may be covered by the covering material 110. The roller tube 120 may be constructed of any appropriate material, such as, for example, aluminum, stainless steel, or plastic.

A hembar 140 may be connected to a lower edge of the covering material 110 and be oriented parallel to the lower edge of the covering material 110. The hembar 140 may be configured to weigh down the covering material 110 and provide an aesthetically-pleasing cover over the lower edge of the covering material 110. Rotation of the roller tube 120 about the longitudinal axis 122 may cause the covering material 110 to be wound or unwound from the roller tube 120 to raise and lower the hembar 140.

The motorized roller shade 100 may comprise a motor drive unit 150 and an idler 160 that may each be configured to be connected to one of the respective mounting brackets 130. The motor drive unit 150 may be located inside of, or otherwise coupled to, the first end 120*a* of the roller tube 120 and the idler 160 may be coupled to the second end 120*b* of the roller tube 120. The motor drive unit 150 may include a motor configured to rotate the roller tube 120 to adjust the covering material 110 between a fully-closed position and a fully-open position and may be configured to retain the covering material 110 at any position intermediate to the fully-closed position and the fully-open position. The idler 160 may be coupled to the roller tube 120 (e.g., at the second end 120*b*) to allow for rotation of the roller tube 120 relative to the mounting brackets 130 as the motor drive unit 150 rotates the roller tube 120. The motor drive unit 150 may include any appropriate drive member (not shown), such as, for example, a DC motor, an AC motor, or a stepper motor. The motorized roller shade 100 may include one or more batteries configured to power the motor drive unit 150. Alternatively, or additionally, the motor drive unit 150 may be configured to connect to a home's electrical system. For example, the roller shade 100 may include an electrical cable configured to be connected to the home's electrical system. The motor drive unit 150 may further include a wireless communication circuit, such as a radio-frequency (RF) receiver or transceiver, for receiving wireless signals (e.g., RF signals). The motor drive unit 150 may be configured to raise and lower the hembar 140 to control the amount of daylight entering a space in response to a command received via the wireless signals.

Figure 2:
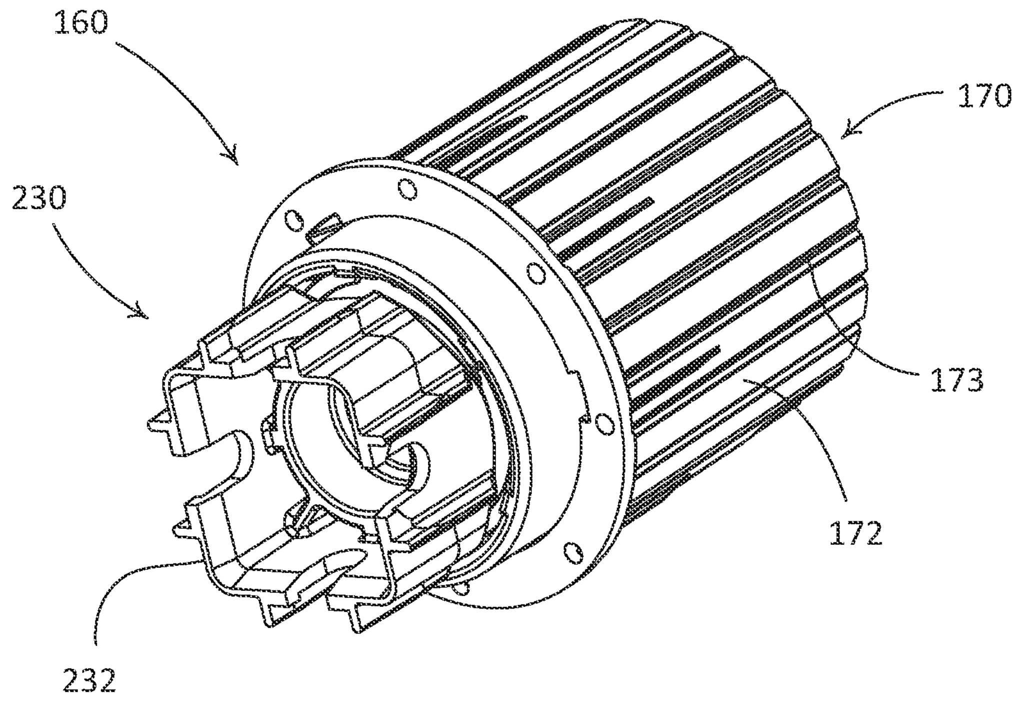
FIG. 2 shows a perspective view of an idler of a motorized window treatment system, according to an embodiment described herein.
Figure 3:
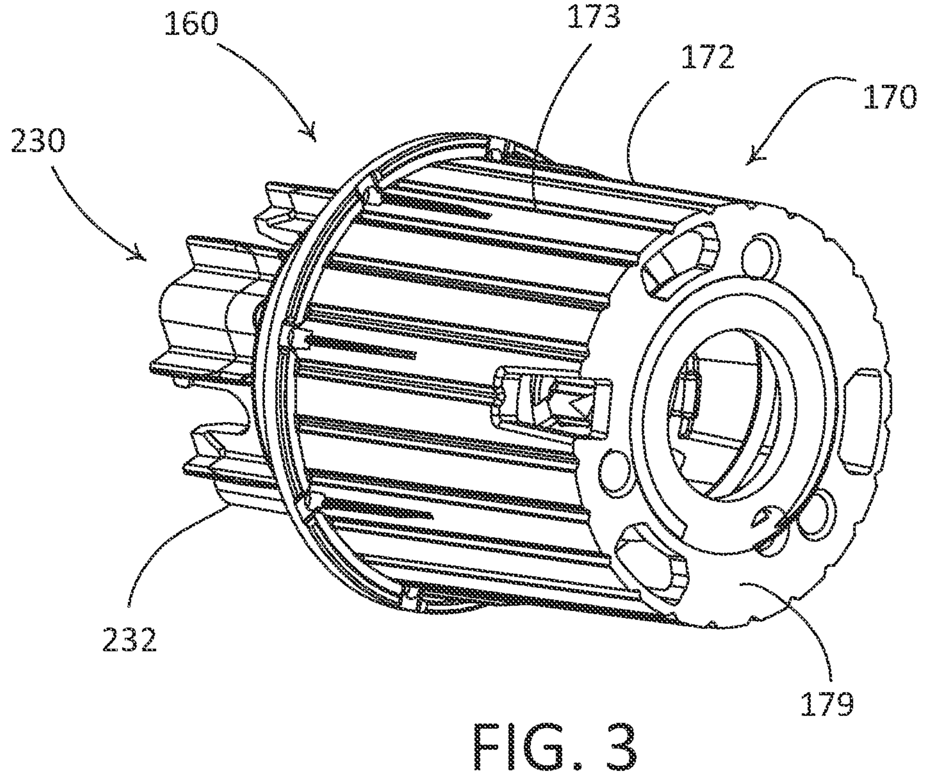
FIG. 3 shows a second perspective view of the idler of FIG. 2.
Figure 4:
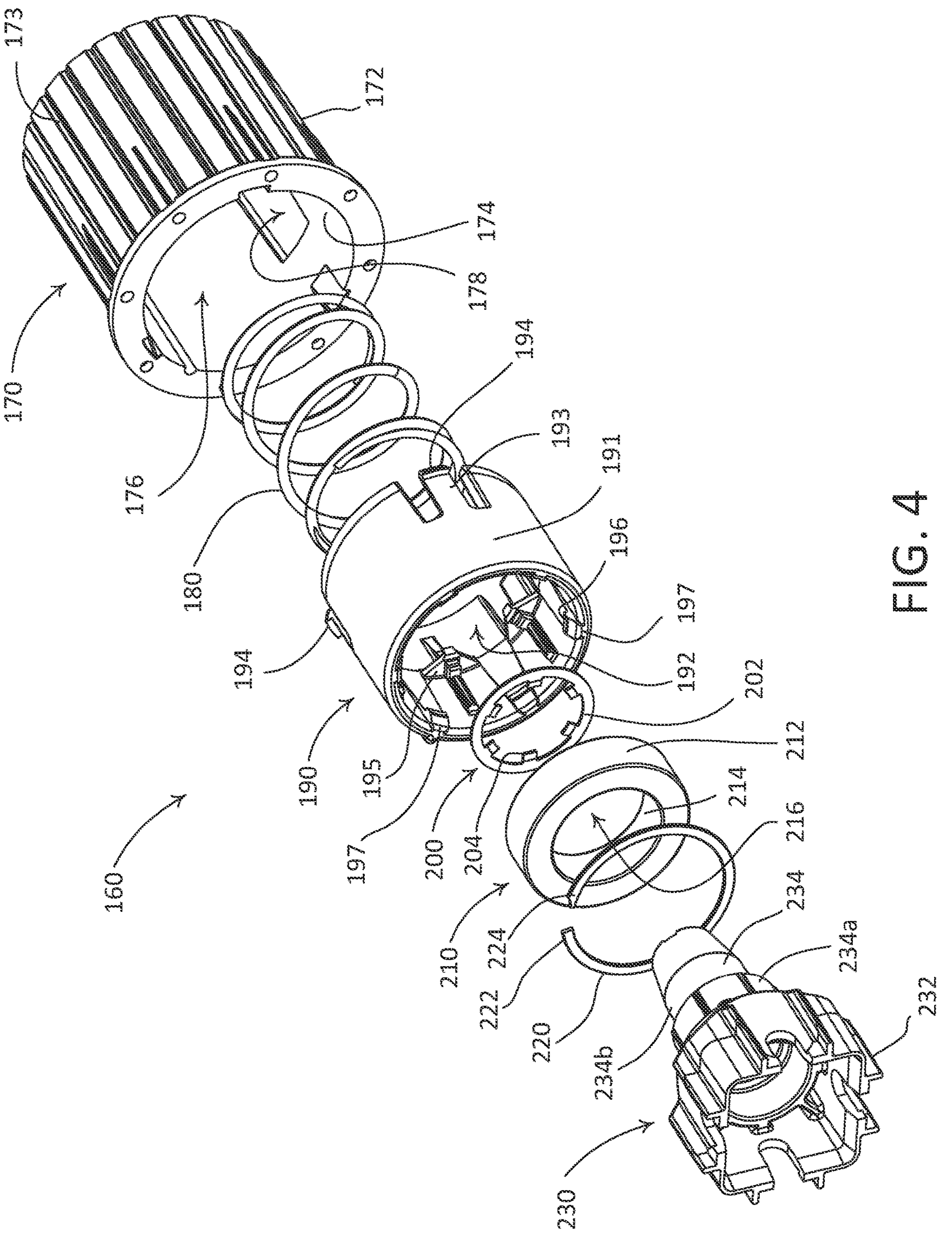
FIG. 4 shows an exploded view of the idler of FIG. 2.
Figure 5:
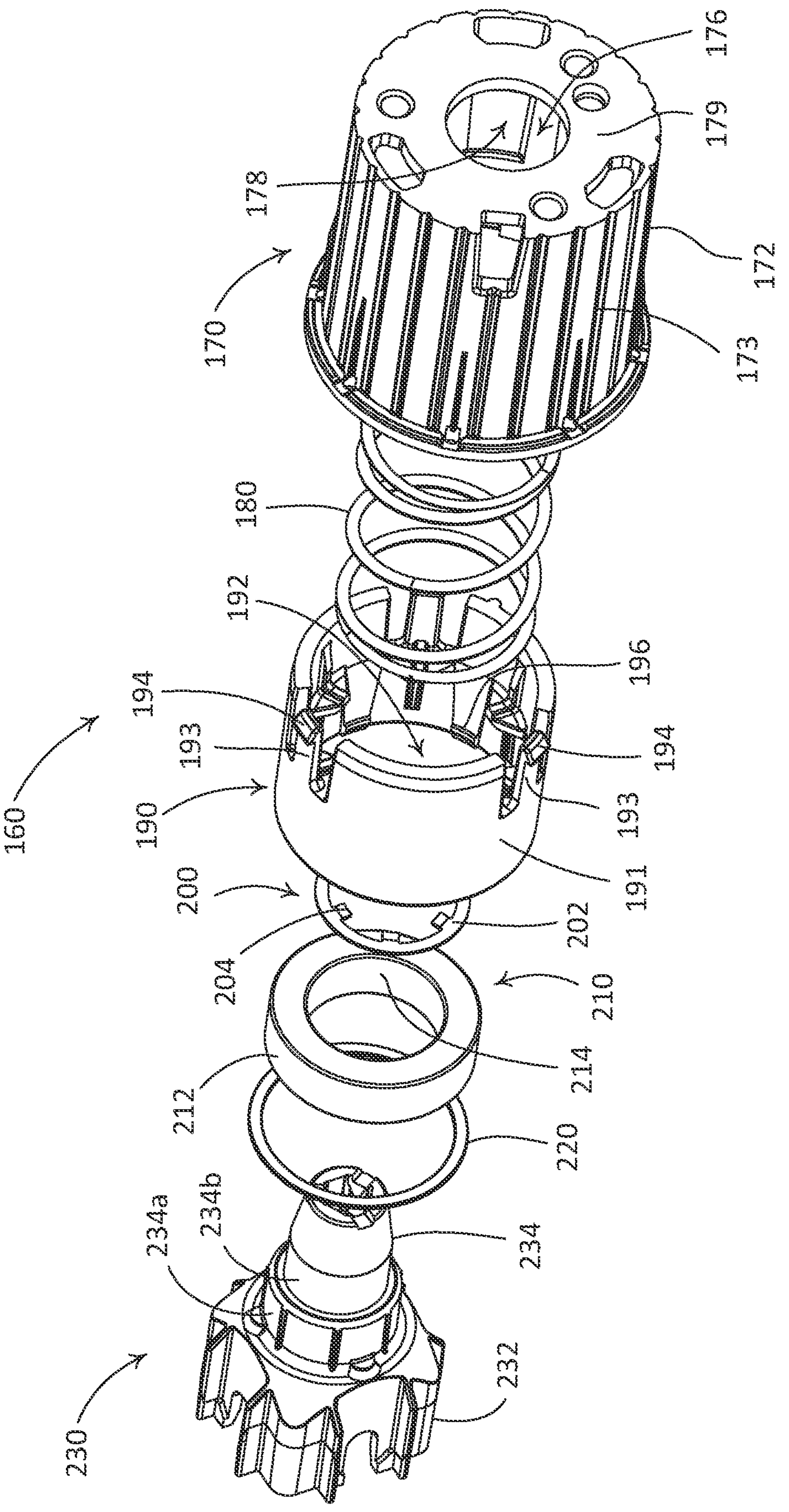
FIG. 5 shows a second exploded view of the idler of FIG. 2.

One embodiment of the idler 160 is shown in FIGS. 2 and 3 and in exploded views in FIGS. 4 and 5. As shown best in FIGS. 4 and 5, in various embodiments, the idler 160 may include a tube sleeve 170, a spring 180, a bearing sleeve 190, a pin retainer 200, a bearing 210, a bearing retainer 220 and a pin 230. The tube sleeve 170 may be configured to couple to the roller tube 120 of the roller shade 100. The tube sleeve 170 may include a body 172 that may be substantially cylindrical and sized and dimensioned to fit within the roller tube 120. The body 172 may include one or more longitudinal slots 173 configured to receive ribs of the roller tube to prevent relative rotation of the roller tube 120 with respect to the tube sleeve 170 such that the roller tube 120 and the tube sleeve 170 rotate together as a unit. The body 172 may include an inner wall 174 that may define an internal chamber 176 that may be configured to receive other components of the idler 160, such as the bearing sleeve 190, as will be described in more detail herein. The tube sleeve 170 may further include one or more recesses 178 extending into the body 172 from the inner wall 174. As will be described in more detail herein, the recesses 178 may be configured to receive protrusions of the bearing sleeve 190 to couple the bearing sleeve 190 to the tube sleeve 170 such that the bearing sleeve 190 and the tube sleeve 170 rotate as a unit and such that the bearing sleeve 190 is axially translatable along the longitudinal axis 122 with respect to the tube sleeve 170. The tube sleeve 170 may further include a ledge 179 extending radially inward from the body 172 at the inboard end of the tube sleeve 170, as best shown in FIG. 5. As will be described herein, when assembled, the ledge 179 may be in contact with one end of the spring 180 such that the spring 180 can apply a force between the tube sleeve 170 and the bearing sleeve 190.

The spring 180 may be any appropriate member capable of imparting an axial force (e.g., along the longitudinal axis 122) on the bearing sleeve 190 or the bearing 210 to drive the bearing sleeve 190 toward an extended position. For example, the spring 180 may be a helical compression spring. In some embodiments, the spring 180 may be a conical spring. Such springs may be constructed of any appropriate material, such as, for example, steel. In other embodiments, the spring 180 may be in the form of a compressible member, such as, for example, an elastomeric member (e.g., a compressible cylinder).

The bearing sleeve 190 may include a body 191 that may be, for example, substantially cylindrical. The body 191 may define a cavity 192. The body 191 may also include one or more arms 193 extending from the body 191 (e.g., parallel to the longitudinal axis 122) with protrusions 194 disposed at the end of the arms 193. In some embodiments, the arms 193 may be flexible arms such that the arms 193 may flex inward toward the center of the body 191. The protrusions 194 may be positioned at the inboard end of the bearing sleeve 190. The protrusions 194 may include a ramped face that may be configured to contact the body 172 of the tube sleeve 170 as the bearing sleeve 190 is inserted into the tube sleeve 170 during assembly. This contact may cause the arms 193 to deflect radially inward during insertion to allow the protrusions 194 to engage the recesses 178. When the protrusions 194 are engaged with the recesses 178, this engagement couples the bearing sleeve 190 and the tube sleeve 170 such that they rotate together. However, the protrusions 194 are able to translate axially within the recesses 178 to allow axial translation of the bearing sleeve 190 with respect to the tube sleeve 170.

The bearing sleeve 190 may further include a ledge 195 extending from the body 191 into the cavity 192. The ledge 195 may assist in locating the bearing 210 in the cavity 192 when the bearing 210 is inserted into the cavity 192 of the bearing sleeve 190. The ledge 195 may also support and restrain the bearing 210 to allow the pin 230 to be press-fit into the bearing 210. The spring 180 may also be in contact with the ledge 195 to provide an axial force on the bearing sleeve 190 to bias the bearing sleeve 190 toward an extended position. In various embodiments (not shown), the ledge 195 may be continuous. In other embodiments, as shown, for example, in FIG. 4, the ledge 195 may be divided into multiple discrete elements.

The bearing sleeve 190 may further include a flange 196 extending into the cavity 192. In various embodiments (not shown), the flange 196 may be continuous around the circumference of the bearing sleeve 190. In other embodiments, as shown in FIG. 4, for example, the flange 196 may be formed by a plurality of tabs 197. In various embodiments, the flange 196 may be positioned adjacent the outboard end of the bearing sleeve 190. As described further herein, the flange 196 may be configured to engage the bearing retainer 220 to prevent the bearing 210 from disengaging from the bearing sleeve 190 after assembly. The flange 196 may be made up of any number of tabs 197. For example, in one embodiment, the flange 196 may be made up of six tabs. The tabs 197 may be equally spaced around the circumference of the cavity 192.

The bearing sleeve 190 may be constructed of any appropriate material. For example, the bearing sleeve 190 may be constructed of plastic (e.g., ABS or Nylon). In addition, the bearing sleeve 190 may be manufactured using any appropriate process. For example, the bearing sleeve 190 may be manufactured using an injection molding process. By forming the ledge 195 and the flange 196 of discrete elements, the bearing sleeve 190 may be manufactured using a simple mold having a straight pull without needing any side action.

In various embodiments, the pin retainer 200 may include a disc-shaped body 202 and a plurality of teeth 204 extending radially inward from the disc-shaped body 202. As explained in more detail herein, the pin retainer 200 may be configured to be positioned adjacent to the inboard face of the bearing 210 within the cavity 192 of the bearing sleeve 190. The teeth 204 may be configured to engage the pin 230 to retain the pin 230 in position and prevent movement of the pin 230 relative to the bearing sleeve 190.

The bearing 210 may be any appropriate component adapted to facilitate rotation of the bearing sleeve 190 relative to the pin 230 and the mounting bracket 130. For example, the bearing 210 may be a rolling-element bearing such as a ball bearing, a roller bearing, or a needle roller bearing. Alternatively, the bearing 210 may be a sliding bearing such as a bushing that may be configured to reduce the friction between the bearing sleeve 190 and the pin 230. The bearing 210 includes an outer face 212 that may be in contact with the inner face 214 of the bearing sleeve 190 and an inner face 214 configured to contact the pin 230. The inner face 214 defines a bore 216 through which a portion of the pin 230 may be inserted.

The bearing retainer 220 may be configured to retain the bearing 210 in position in the bearing sleeve 190. In various embodiments, the bearing retainer 220 may be in the form of a C-clip. In other words, the bearing retainer 220 may be a retaining clip that is a partial circle. The bearing retainer 220 may be configured such that it can be compressed from a first, unstressed outer diameter to a second, reduced diameter by compressing the ends of the C-clip closer together. This may allow the bearing retainer 220 to be compressed, inserted between the outboard side of the bearing 210 and the flange 196 of the bearing sleeve 190, and then released toward the bearing retainer 220's unstressed configuration to retain the bearing 210. The bearing retainer 220 may be constructed of any appropriate material. For example, the bearing retainer 220 may be constructed of spring steel, stainless steel, or copper. In some embodiments, the bearing retainer 220 may be configured to be installed and/or removed using retaining ring pliers.

The pin 230 may include a bracket engaging portion 232 configured to engage a mounting bracket 130. The bracket engaging portion 232 may take on any appropriate form. For example, the bracket engaging portion 232 may include an extension for engaging an aperture in the mounting bracket 130. The pin 230 may also include a shaft 234 extending from the bracket engaging portion 232. The shaft 234 may be a stepped shaft with a first portion **234*a* configured to be inserted in the bore 216 of the bearing 210. The shaft 234 may also include a second portion 234*b* configured to engage the teeth 204 of the pin retainer 200. In some embodiments, the second portion 234*b* may have a smaller diameter than the first portion 234*a*. When assembled, the second portion 234*b* may be positioned inboard in relation to the first portion 234*a***.

Figure 6:
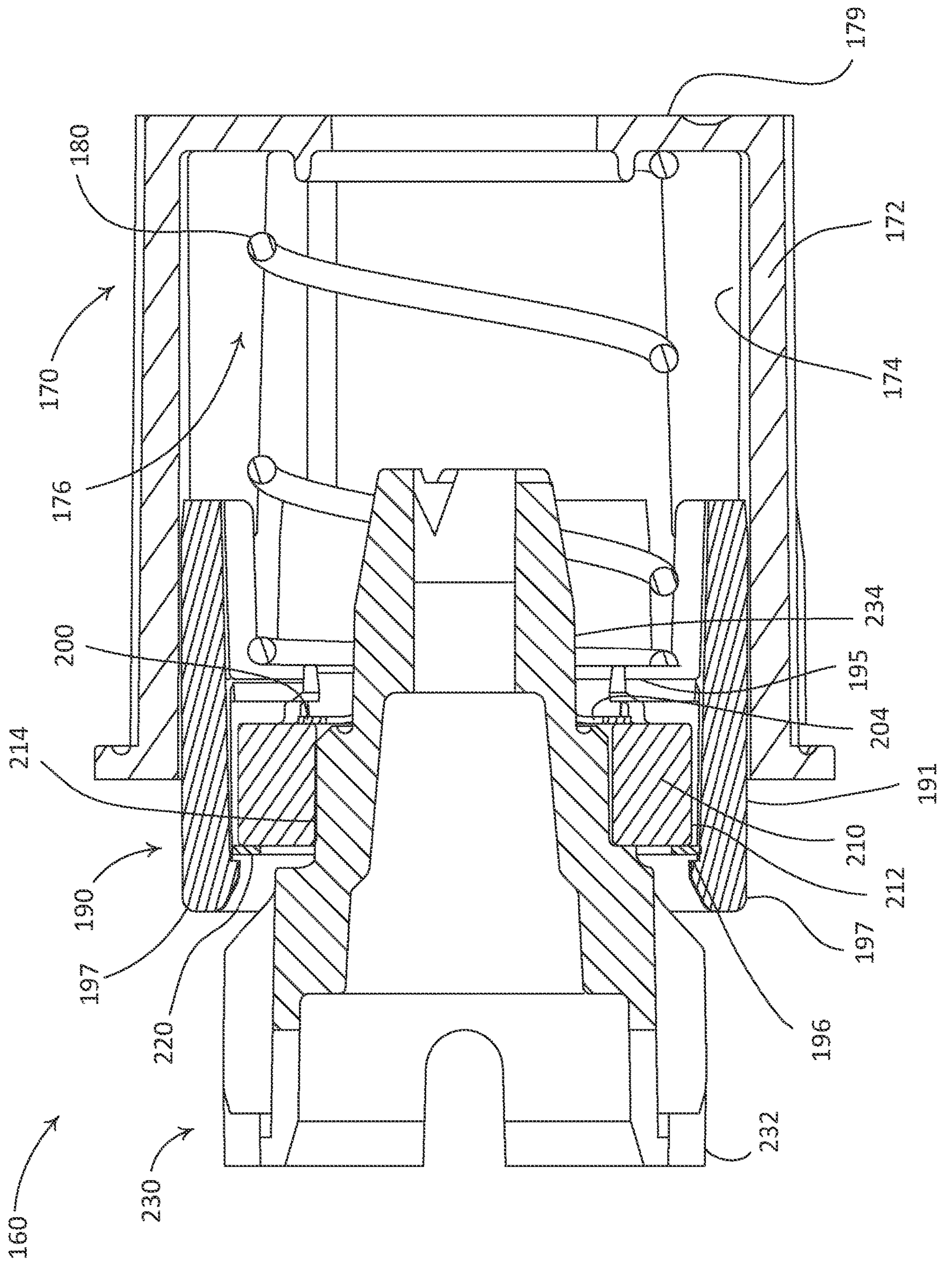
FIG. 6 shows a side cross-sectional view of the idler of FIG. 2.

FIG. 6 shows a cross-sectional view of the assembled idler 160. As shown, the shaft 234 of the pin 230 may be disposed within the bore 216 of the bearing 210 with the inner face 214 of the bearing 210 in contact with the shaft 234. In various embodiments, the pin 230 may form a press-fit with the inner face 214 of the bearing 210. The outer face 212 of the bearing 210 may be in contact with or adjacent to the body 191 of the bearing sleeve 190. Hence, the bearing 210 facilitates rotation of the bearing sleeve 190 relative to the pin 230. For example, in use, the pin 230 may be fixed in position by engagement with a mounting bracket 130 and the bearing sleeve 190 may rotate with the tube sleeve 170 and the roller tube 120.

As further shown in FIG. 6, the bearing retainer 220 may be positioned between the outboard face of the bearing 210 and the flange 196 of the bearing sleeve 190. In this position, the bearing retainer 220 and the flange 196 act together to prevent the bearing 210 from exiting the cavity 192 of the bearing sleeve 190. In use, the weight of the window covering may cause bending of the roller tube 120. This bending may result in an effective shortening of the roller tube 120 that causes the tube sleeve 170 and bearing sleeve 190 to be pulled inward toward the center of the window treatment. In prior art window treatment systems, this movement may cause the bearing sleeve to disengage from the bearing. In contrast, in the embodiments described herein, the bearing retainer 220 and the flange 196 prevent the bearing sleeve 190 from disengaging the bearing 210.

FIG. 6 also shows that the teeth 204 of the pin retainer 200 may be engaged with the shaft 234 of the pin 230 (e.g., with the second portion **234*b*). The pin retainer 200 may be positioned adjacent to, or in contact with, the inboard face of the bearing 210. The engagement of the pin retainer 200 with the pin 230 may prevent movement of the pin 230 relative to the bearing 210 and the bearing sleeve 190. For example, any relative movement of the pin 230 may cause the body 202 of the pin retainer 200 to bear against the bearing 210. This may further prevent pull-out of the pin 230 and the bearing 210 from the bearing sleeve 190**.

As shown in FIG. 6, the spring 180 may be disposed in the internal chamber 176 of the tube sleeve 170 with a first end of the spring 180 in contact with the ledge 179 of the tube sleeve 170 and the second end of the spring 180 in contact with the ledge 195 of the bearing sleeve 190. As described above, the protrusions 194 of the bearing sleeve 190 are engaged with the recesses 178 of the tube sleeve 170 such that the bearing sleeve 190 and the tube sleeve 170 may translate with respect to one another along the longitudinal axis 122 of the roller tube 120. For example, during mounting of the roller tube 120 to the mounting brackets 130, the bearing sleeve 190—along with the bearing 210 and the pin 230—translate inward toward the center of the roller tube 120 to allow the idler 160 (e.g., the bracket engaging portion 232 of the pin 230) to be engaged with the mounting bracket 130. After mounting, the spring 180 may apply a force on the bearing 210 to bias the bearing sleeve 190, and the pin 230, toward an extended position. This may assist in maintaining engagement of the pin 230 with the mounting bracket 130.

Figure 7:
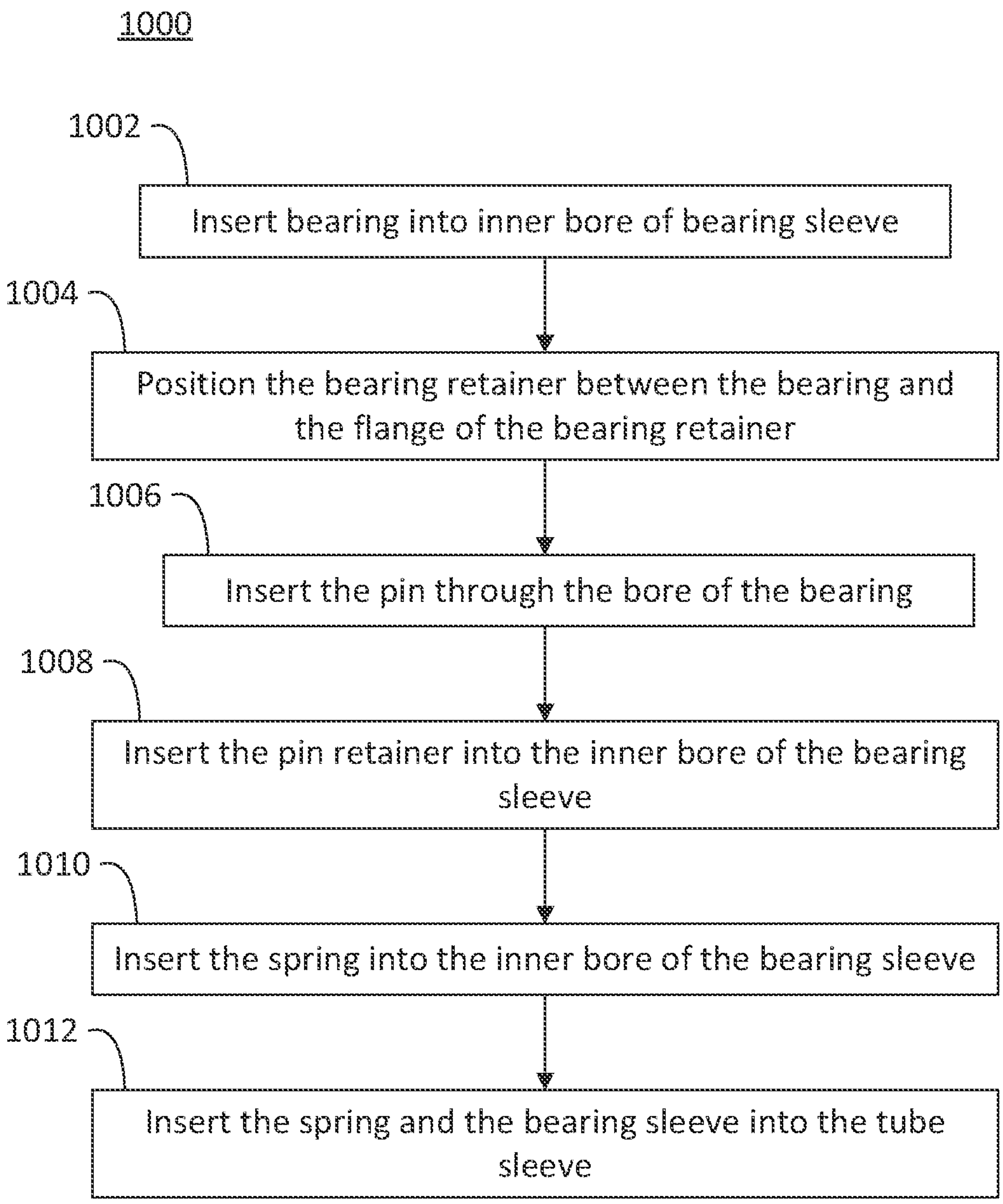
FIG. 7 illustrates a method of assembling an idler for a motorized window treatment system, according to an embodiment described herein.

In another aspect, a method 1000 of assembling the idler 160 is illustrated in FIG. 7. At step 1002, the bearing 210 may be inserted into the cavity 192 of the bearing sleeve 190. For example, the bearing 210 may be positioned between the ledge 195 and the flange 196 of the bearing sleeve 190. At step 1004, the bearing retainer 220 may be positioned between the bearing 210 and the flange 196 of the bearing sleeve 190. In some embodiments, the bearing retainer 220 may be a C-clip and positioning the bearing retainer 220 includes reducing the outer diameter of the bearing retainer 220 so that it can be inserted past the flange 196. At step 1006, the pin 230 may be inserted through the bore of the bearing 210. In some embodiments, the pin 230 may be press-fit into the bore of the bearing 210. In some embodiments, at step 1008, the pin retainer 200 may be inserted into the cavity 192 of the bearing sleeve such that the teeth 204 of the pin retainer 200 engage the shaft 234 of the pin 230 to retain the pin 230 in place. The method may also include, at step 1010, inserting the spring 180 into the cavity 192 of the bearing sleeve 190. The method may further include, at step 1012, inserting the spring 180 and the bearing sleeve 190 into the tube sleeve 170.

While the foregoing description and drawings represent preferred or exemplary embodiments of the present disclosure, it will be understood that various additions, modifications and substitutions may be made therein without departing from the spirit and scope and range of equivalents of the accompanying claims. In particular, it will be clear to those skilled in the art that the embodiments disclosed herein may be embodied in other forms, structures, arrangements, proportions, sizes, and with other elements, materials, and components, without departing from the spirit or essential characteristics thereof. One skilled in the art will further appreciate that the window treatment systems described herein may be used with many modifications of structure, arrangement, proportions, sizes, materials, and components and otherwise, used in the practice of the window treatment systems, which are particularly adapted to specific environments and operative requirements without departing from the principles of the present disclosed herein. The presently disclosed embodiments are therefore to be considered in all respects as illustrative and not restrictive, the scope being defined by the appended claims and equivalents thereof, and not limited to the foregoing description or embodiments. Rather, the appended claims should be construed broadly, to include other variants and embodiments, which may be made by those skilled in the art without departing from the scope and range of equivalents. All patents and published patent applications identified herein are incorporated herein by reference in their entireties.

I claim:

1. A window treatment system, comprising:

a roller tube extending from a first end to a second end and having a longitudinal axis extending between the first end and the second end;

a covering material coupled to the roller tube such that the covering material is configured to be wound and unwound from the roller tube when the roller tube rotates about the longitudinal axis; and an idler coupled to the second end of the roller tube, the idler comprising:

a bearing sleeve coupled to the roller tube such that the bearing sleeve and the roller tube rotate together about the longitudinal axis, wherein the bearing sleeve includes a body defining a cavity and a flange extending into the cavity;

a bearing disposed at least partially within the cavity of the bearing sleeve, the bearing defining a bore;

a bearing retainer disposed between the flange and an outboard face of the bearing such that the bearing retainer maintains the bearing within the bearing sleeve;

a pin at least partially disposed in the bore of the bearing such that the bearing sleeve and the roller tube are able to rotate about the longitudinal axis with respect to the pin; and a pin retainer engaged with the pin to prevent axial translation of the pin relative to the bearing, the pin retainer including a plurality of teeth engaged with a shaft of the pin.

2. The system of claim 1, wherein the pin retainer is in contact with an inboard face of the bearing.

3. The system of claim 1, further comprising:

a motor drive unit coupled to the first end of the roller tube, the motor drive unit configured to rotate the roller tube about the longitudinal axis.

4. The system of claim 3, further comprising:

a first mounting bracket and a second mounting bracket each configured to be mounted to a structure adjacent to a window, wherein the motor drive unit is configured to engage the first mounting bracket and the pin is configured to engage the second mounting bracket.

5. The system of claim 1, wherein the flange of the bearing sleeve is defined by a plurality of tabs.

6. The system of claim 1, wherein the bearing retainer is a collapsible retaining ring.

7. The system of claim 1, wherein the idler further comprises a tube sleeve coupled to the roller tube and to the bearing sleeve such that the roller tube, the tube sleeve, and the bearing sleeve rotate together about a longitudinal axis of the roller tube.

8. A window treatment system, comprising:

a roller tube extending from a first end to a second end and having a longitudinal axis extending between the first end and the second end;

a covering material coupled to the roller tube such that the covering material is configured to be wound and unwound from the roller tube when the roller tube rotates about the longitudinal axis; and an idler coupled to the second end of the roller tube, the idler comprising:

a bearing sleeve coupled to the roller tube such that the bearing sleeve and the roller tube rotate together about the longitudinal axis, wherein the bearing sleeve includes a body defining a cavity and a flange extending into the cavity;

a bearing disposed at least partially within the cavity of the bearing sleeve, the bearing defining a bore;

a bearing retainer disposed between the flange and an outboard face of the bearing such that the bearing retainer maintains the bearing within the bearing sleeve;

a pin at least partially disposed in the bore of the bearing such that the bearing sleeve and the roller tube are able to rotate about the longitudinal axis with respect to the pin; and a tube sleeve coupled to the roller tube and to the bearing sleeve such that the roller tube, the tube sleeve, and the bearing sleeve rotate together about a longitudinal axis of the roller tube.

9. The system of claim 8, wherein the tube sleeve and the bearing sleeve are coupled such that the bearing sleeve is able to axially translate along the longitudinal axis with respect to the tube sleeve.

10. The system of claim 8, wherein the idler further comprises a spring, and wherein a first end of the spring is in contact with a ledge of the tube sleeve and a second end of the spring is in contact with a ledge of the bearing sleeve.

11. The system of claim 8, wherein the idler further comprises a pin retainer engaged with the pin to prevent axial translation of the pin relative to the bearing, the pin retainer including a plurality of teeth engaged with a shaft of the pin.

12. An idler for a window treatment system, the idler comprising:

a bearing sleeve including a body defining a cavity and a flange extending into the cavity;

a bearing disposed at least partially within the cavity of the bearing sleeve, the bearing defining a bore;

a bearing retainer disposed between the flange and an outboard face of the bearing such that the bearing retainer maintains the bearing within the bearing sleeve; and a pin at least partially disposed in the bore of the bearing such that the bearing sleeve is able to rotate with respect to the pin;

wherein the pin has a bracket engaging portion configured to engage a mounting bracket of the window treatment system.

13. The idler of claim 12, further comprising:

a tube sleeve coupled to the bearing sleeve and configured to couple to a roller tube of the window treatment system such that the roller tube, the tube sleeve, and the bearing sleeve rotate together about a longitudinal axis of the roller tube.

14. The idler of claim 13, wherein the tube sleeve and the bearing sleeve are coupled such that the bearing sleeve is able to axially translate with respect to the tube sleeve along the longitudinal axis of the roller tube.

15. The idler of claim 13, further comprising:

a spring, wherein a first end of the spring is in contact with a ledge of the tube sleeve and a second end of the spring is in contact with a ledge of the bearing sleeve.

16. The idler of claim 12, further comprising:

a pin retainer comprising a plurality of teeth engaged with the pin to prevent axial translation of the pin relative to the bearing.

17. The idler of claim 16, wherein the pin retainer is in contact with an inboard face of the bearing.

18. The idler of claim 12, wherein the bearing retainer is a collapsible retaining ring.

19. The idler of claim 12, wherein the flange of the bearing sleeve is defined by a plurality of tabs.

20. The idler of claim 12, wherein the pin forms a press-fit within the bore of the bearing.

* * * * *